No. 795,729. PATENTED JULY 25, 1905.
L. OTZEN.
DEVICE FOR PACKAGING FRUIT AND THE LIKE.
APPLICATION FILED MAR. 24, 1905.
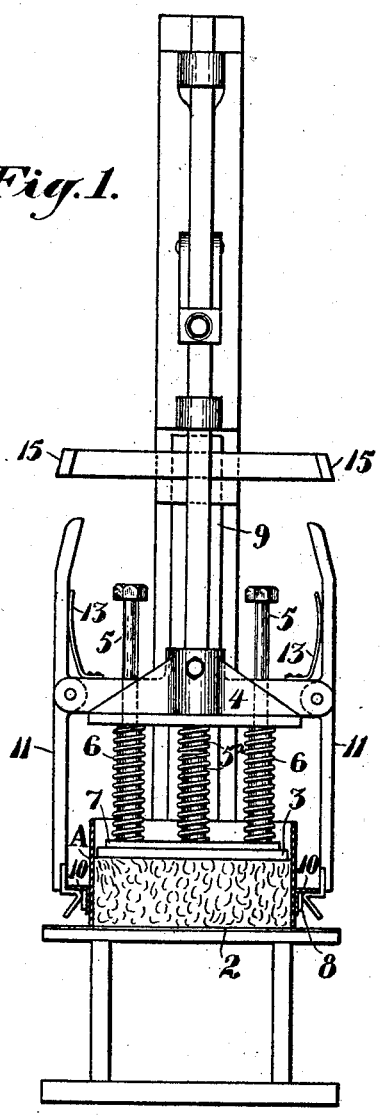
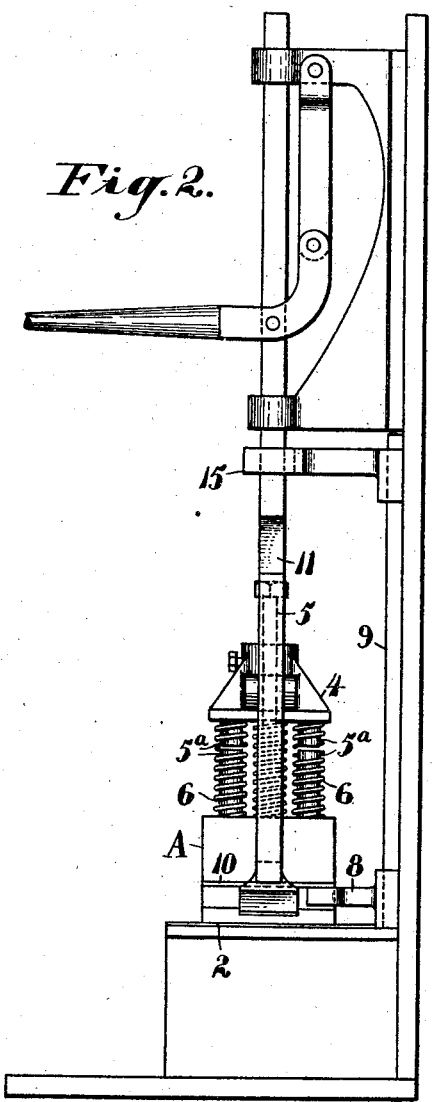
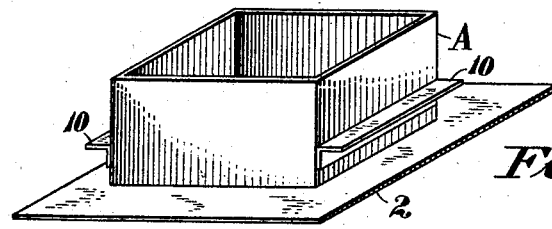
Witnesses:—
Inventor,
Lorenz Otzen
By Geo. H. Strong
Atty

UNITED STATES PATENT OFFICE.

LORENZ OTZEN, OF SAN FRANCISCO, CALIFORNIA.

DEVICE FOR PACKAGING FRUIT AND THE LIKE.

No. 795,729. Specification of Letters Patent. Patented July 25, 1905.

Application filed March 24, 1905. Serial No. 251,909.

*To all whom it may concern:*

Be it known that I, LORENZ OTZEN, a citizen of the United States, residing at the city and in the county of San Francisco and State of California, have invented new and useful Improvements in Devices for Packaging Fruit and the Like, of which the following is a specification.

My invention relates to a device which is especially designed for placing dried fruits into rectangular or cubical packages convenient for transportation and sale.

It consists in the combination of devices and in details of construction which will be more fully explained by reference to the accompanying drawings, in which—

Figure 1 is a front view of my apparatus. Fig. 2 is a side elevation of same. Fig. 3 is a perspective view of a former placed on a metallic base.

In the packing of dried fruit and like articles into rectangular or cubical packages or boxes it is customary to employ forms which are made of metal and hinged together at one angle, so that they may be opened at the diagonally opposite angle. These forms are of a width and depth sufficient to receive a quantity of material which will fill the box or package within which it is ultimately designed to inclose it.

The form is placed beneath a press and when filled with fruit the fruit is compressed to the requisite degree. Then the form is opened, leaving the fruit in the shape which the form has given it.

It is the object of my invention to provide an integral and continuous former and means by which such a former may be removed from the fruit without hinges or joints.

As shown in the drawings, A is a box of suitable shape and capacity usually rectangular in horizontal section and having a sufficient depth to receive the amount of fruit required to make the package, allowing for the compression that will take place. This box is open both at top and bottom and is usually placed upon a metallic base, as at 2. The fruit having been placed within the box and the latter sufficiently filled, a board or plate, as at 3, is placed upon the top of the fruit, and the device being placed under any suitable press the fruit is compressed to the required degree.

As I have here shown, the press may be of any suitable character, such as a lever-press having a guided slidable stem which fits into the block 4, where it may be held by a set-screw. Through this block extend the vertically-disposed guide-rods 5, and these are surrounded by spiral springs, as shown at 6. These guide-rods are slidable in the block 4 and at the lower ends are fixed to a plate 7, which plate is adapted to rest upon a board or plate within the forming-box. When pressure is applied, the block or platen 4 is depressed until the short rods $5^a$, which project in line with each other from the plates 4 and 7, are brought into contact, and the fruit is then compressed to any desired degree.

In order to properly place the box or former in line with these movable pressing parts, I have shown a plate 8, which has a notch cut away in one side of such size that the edges of the forming-box will exactly fit into the notch. This plate is fixed and slidable upon a standard, as at 9, which is bolted or otherwise fixed with relation to the press, and thus the forming-boxes can be rapidly and accurately placed in line of the movement of the plunger. When the fruit has been suitably compressed, it is desirable to leave it upon the base-plate 2, upon which the forming-box stands, and as the fruit will have a certain amount of adhesion to the sides of the former some means are necessary to hold the fruit down while lifting the former. Such means I have shown in the form of lugs or projections 10, which are here shown upon the ends of the forming-box, and these projections serve as attachments to lift the former, while the fruit within may be held in position until the former has been released from the compressed package.

In very small packages it will only be necessary to press the thumbs upon the plate which rests upon the fruit and with the fingers to pull up on the lugs or projections 10, thus holding the fruit down by the pressure upon the plate and lifting the former until it is clear of the compressed package. These packages may then be removed with the plate upon which they rest, and the case or covering with which they are to be finally and permanently inclosed is applied at other points.

Where the packages are large, it will need some stronger method for lifting the former. In the present case I have shown arms 11 hinged to the ends of the plate 4, and the lower ends of these arms have inwardly-turned hook portions which are adapted to engage with the projections or lugs 10 of the former. Springs 13 act to normally close these lower ends in, and the ends are so beveled or inclined that when the plate 4 is pressed down in the action of compressing the fruit these ends of the levers will hook beneath the lugs of the former and in readiness to lift it when desired. As soon as the pressure is released the plate 4 will be forced up by the action of the springs 6, and these pressing upon the plate 7 will hold the latter down and with it the fruit beneath. The hooks at the lower ends of the lever-arms engaging the lugs on the former, the pressure of the springs lifting the plate 4 will also lift these levers and will thus raise the former to the fruit, leaving the latter in position upon its supporting-plate.

As soon as the former is clear of the fruit it is released from the levers as follows: In the upper part of the standard 9 or at other convenient point are fixed the arms 15, and these arms are in such position that as the plate 4 rises the upper ends of the hinged levers, which are bent inwardly, as shown, will pass between the arms 15 and will thus be compressed against the tension of the springs 13, and the lower hook ends of the levers will be disengaged from the former A, thus leaving it free to be removed. As soon as the plate 4 is again depressed the upper ends of the lever-arms will clear the arms 15 and will thus allow the springs 13 to act and close the lower hook ends of the lever-arms into position to again engage the lugs of the next forming-box. Thus the operation of compressing and forming the fruit is rapidly carried on, and the fruit is readily released from the former and left in position to receive its permanent envelop.

Having thus described my invention, what I claim, and desire to secure by Letters Patent, is—

1. In a fruit-pressing device, the combination of a box having rigid sides and open top and bottom, means for compressing fruit therein, an interior pressure-plate, means for raising the box after the fruit has been compressed therein, and means for holding the pressure-plate in contact with the fruit while the box is being raised relative thereto whereby the fruit is stripped from the box.

2. In a fruit pressing and packing device, a rigid-sided box open at top and bottom, a plate fitting within the same and through which pressure is applied upon the fruit, a press for applying pressure to the plate, exterior lugs on the box and devices carried by the press to engage said lugs at the completion of the pressing operation whereby the box may be raised by and during return movement of the press, and supplementary pressure means acting on the plate to hold the fruit during the lifting of the box relative thereto whereby the fruit is delivered from the box.

3. In a fruit pressing and packing device, a box with rigid sides and open top and bottom, a pressure-plate fitting the box, means for pressing the plate upon the fruit, engaging means between the box and pressure devices for connecting one with the other whereby the box is raised during the return movement of the pressure devices, and springs through which an elastic pressure is transmitted to the plate substantially coördinate with the movement of the box whereby the fruit is ejected from the box.

4. In a fruit-pressing device, a box with open top and bottom, lugs upon the exterior of the box, a plate fitting the interior of the box, means for applying an elastic pressure to said plate and the fruit, and means engaging said lugs whereby the box may be lifted while pressure upon the fruit is continued.

5. In a fruit-pressing device, a box with open top and bottom and a support for the box, a spring-pressed plate fitting the box, a press acting through the springs upon the plate, lugs upon the box, and connections between the lugs and press and adapted during the return movement of the press to raise the box while the fruit is held down by the springs.

6. In a fruit-pressing device, a box with open top and bottom and a support upon which it rests, a plate movable in the box, a press and a platen movable thereby, springs through which an elastic pressure is transmitted from the platen to the plate in the box after the fruit is compressed, lugs on the box, latches upon the platen engaging the lugs and acting to raise the box while the plate is held down by the springs.

7. In a fruit-pressing device, a box with open top and bottom, and a pressure-plate fitting the box, a press and a platen connected therewith, springs interposed between the pressure-plate and the platen, lugs upon the box, spring-pressed latches upon the platen which engage the lugs when the platen is depressed and by which the box is raised when the platen rises to leave the pressure-plate and fruit.

8. In a fruit-pressing device, a box with open top and bottom and a pressure-plate fitting therein, a plunger and a platen movable therewith, springs interposed between the plate and plunger, spring-pressed latches hinged to the plunger lugs upon the box with which the latches engage when the plunger is depressed whereby the box is raised when the plunger rises, and stops by which the latches are subsequently opened to release the box.

9. In a fruit-pressing device, a box, with open top and bottom, and a pressure-plate fitting therein, a plunger and a platen movable therewith, means for transmitting pressure from the plunger to the pressure-plate, means for lifting the box after compression has been completed, and springs acting between the plunger and the pressure-plate, to hold the latter down while the box is raised.

10. In a fruit-pressing device, a box with open top and bottom and a pressure-plate fitting therein, a plunger and a platen movable therewith, a guide by which the box is alined with the press mechanism, means for transmitting pressure from the plunger to the pressure-plate in the box, means for lifting the box after compression has been completed and springs acting between the plunger and pressure-plate to hold the latter down while the box is raised.

In testimony whereof I have hereunto set my hand in presence of two subscribing witnesses.

LORENZ OTZEN.

Witnesses:
   Geo. H. Strong,
   S. H. Nourse.